(12) United States Patent
Descamps et al.

(10) Patent No.: US 9,011,677 B2
(45) Date of Patent: Apr. 21, 2015

(54) QUICK STATIC DECANTER FOR PRETHICKENING WATER TREATMENT SLUDGE, AND PLANT INCLUDING SUCH A DECANTER

(75) Inventors: Patrick Descamps, Marly le Roi (FR); Claude Prevot, Vélizy (FR); André Haubry, Mezy sur Seine (FR)

(73) Assignee: Degremont (FR)

( * ) Notice: Subject to any disclaimer, the term of this patent is extended or adjusted under 35 U.S.C. 154(b) by 394 days.

(21) Appl. No.: 13/141,773

(22) PCT Filed: Dec. 23, 2009

(86) PCT No.: PCT/IB2009/055928
§ 371 (c)(1),
(2), (4) Date: Aug. 2, 2011

(87) PCT Pub. No.: WO2010/073222
PCT Pub. Date: Jul. 1, 2010

(65) Prior Publication Data
US 2011/0272346 A1 Nov. 10, 2011

(30) Foreign Application Priority Data
Dec. 24, 2008 (FR) ..................... 08 07445

(51) Int. Cl.
*B01D 21/01* (2006.01)
*B01D 21/06* (2006.01)
(Continued)

(52) U.S. Cl.
CPC ........... *C02F 11/14* (2013.01); *B01F 15/00331* (2013.01); *B01F 15/00136* (2013.01);
(Continued)

(58) Field of Classification Search
CPC ........ B01D 21/01; B01D 21/06; B01D 21/24; B01D 21/245; B01D 21/0024; B01D 21/30; B01D 21/0018; B01D 21/2405; B01D 21/34; C02F 1/52; C02F 1/5209; C02F 11/14; C02F 2209/10; C02F 2209/42; C02F 1/008; C02F 1/56; G05D 11/02; G05D 11/03; B01F 15/0201; B01F 15/0035; B01F 15/0031; B01F 15/00136; B01F 15/00142; B01F 15/00155
USPC .............. 210/85, 86, 87, 96.1, 143, 202, 203, 210/205, 208, 209, 513, 523, 527, 528, 210/532.1, 534, 535, 538, 540, 103, 104, 210/134, 207, 709, 744, 519; 700/266, 273; 366/153.1
See application file for complete search history.

(56) References Cited

U.S. PATENT DOCUMENTS 1,518,136 A 12/1924 Dorr
2,154,132 A * 4/1939 Mallory .................. 210/614
(Continued)

FOREIGN PATENT DOCUMENTS

| DE | 4138469 A1 | 5/1993 |
|---|---|---|
| EP | 0158714 A2 | 10/1985 |
| GB | 1531939 A | 11/1978 |
| GB | 2113563 | * 8/1983 |

*Primary Examiner* — Joseph Drodge
(74) *Attorney, Agent, or Firm* — The Belles Group, P.C.

(57) ABSTRACT

The invention relates to a static decanter (D) for prethickening liquid sludge in a water treatment plant, in particular wastewater, comprising an inclined bottom (8), the decanter being provided with a liquid sludge supply pump (13), a device for injecting a polymer in the liquid sludge, an overspill discharge (23) and a pump (26) for extracting the prethickened sludge from the decanter. The decanter further includes a means for accelerating the sludge decantation, a means (M) for adjusting the concentration of suspended material in the prethickened sludge at the outlet, and capable of maintaining the concentration of the prethickened sludge extracted from the decanter at a substantially constant level despite the concentration variations at the inlet, and a means (M3) for adjusting the level of the sludge blanket (V) and capable of maintaining said level at the lowest possible level.

12 Claims, 2 Drawing Sheets

(51) Int. Cl.
*B01D 21/30* (2006.01)
*B01D 21/34* (2006.01)
*C02F 1/52* (2006.01)
*C02F 1/56* (2006.01)
*B01F 15/02* (2006.01)
*B01F 15/04* (2006.01)
*C02F 11/14* (2006.01)
*B01F 15/00* (2006.01)
*B01D 21/24* (2006.01)
*C02F 1/00* (2006.01)

(52) U.S. Cl.
CPC ....... *B01F15/0035* (2013.01); *B01F 15/00142* (2013.01); *B01D 21/34* (2013.01); *B01D 21/2405* (2013.01); *B01D 21/01* (2013.01); *B01D 21/06* (2013.01); *B01D 21/245* (2013.01); *B01D 21/30* (2013.01); *C02F 1/008* (2013.01); *C02F 1/5209* (2013.01); *C02F 1/56* (2013.01); *C02F 2209/10* (2013.01); *C02F 2209/11* (2013.01); *C02F 2209/40* (2013.01)

(56) References Cited

U.S. PATENT DOCUMENTS

| | | | | |
|---|---|---|---|---|
| 2,365,293 | A | * | 12/1944 | Robinson ................. 210/125 |
| 3,281,594 | A | | 10/1966 | Garrison |
| 3,608,723 | A | * | 9/1971 | Brown .................... 210/114 |
| 3,684,092 | A | * | 8/1972 | Busse et al. ............... 210/768 |
| 4,055,494 | A | | 10/1977 | Emmett, Jr. |
| 4,120,791 | A | * | 10/1978 | Wright .................... 210/802 |
| 4,226,714 | A | | 10/1980 | Furness et al. |
| 4,392,955 | A | * | 7/1983 | Soriente ................ 210/195.4 |
| 5,006,231 | A | * | 4/1991 | Oblad et al. .............. 210/96.1 |
| 5,435,924 | A | * | 7/1995 | Albertson ................ 210/803 |
| 5,601,704 | A | * | 2/1997 | Salem et al. ............... 210/86 |
| 5,904,855 | A | * | 5/1999 | Manz et al. ............... 210/709 |
| 6,290,842 | B1 | * | 9/2001 | Miyanoshita et al. ......... 210/97 |
| 6,408,227 | B1 | * | 6/2002 | Singhvi et al. ............. 700/266 |
| 6,589,428 | B1 | * | 7/2003 | Bujon et al. .............. 210/739 |
| 6,673,240 | B2 | * | 1/2004 | Fassbender et al. ........... 210/87 |
| 6,673,246 | B2 | * | 1/2004 | Markowitz et al. .......... 210/670 |
| 6,814,874 | B2 | * | 11/2004 | Ruehrwein ................ 210/744 |
| 2008/0135473 | A1 | * | 6/2008 | Pophali et al. ............. 210/525 |
| 2009/0255876 | A1 | * | 10/2009 | Dunbar .................... 210/709 |

\* cited by examiner

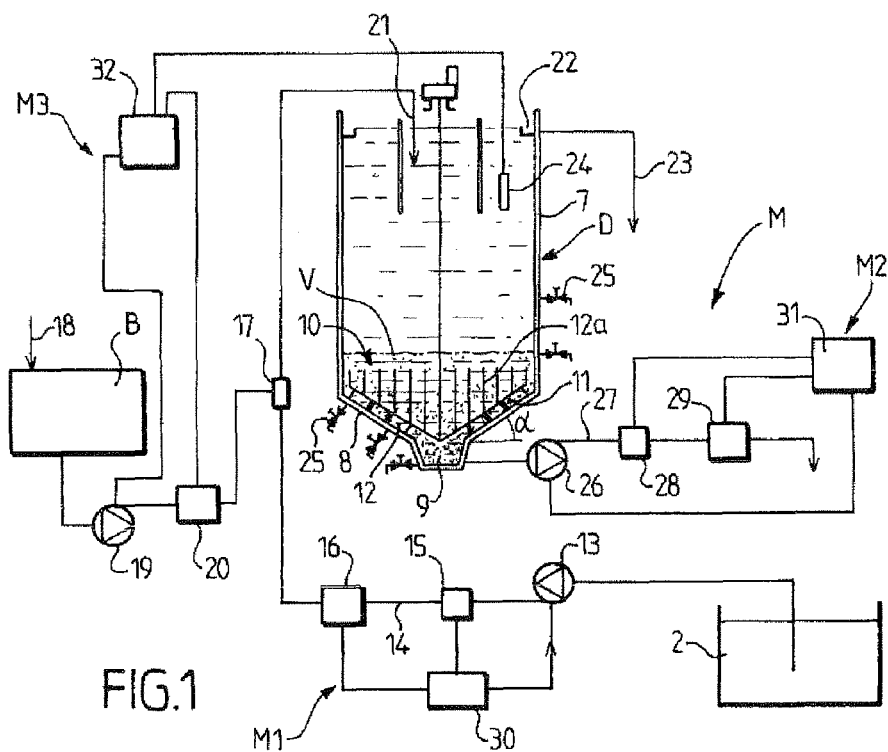
FIG.1
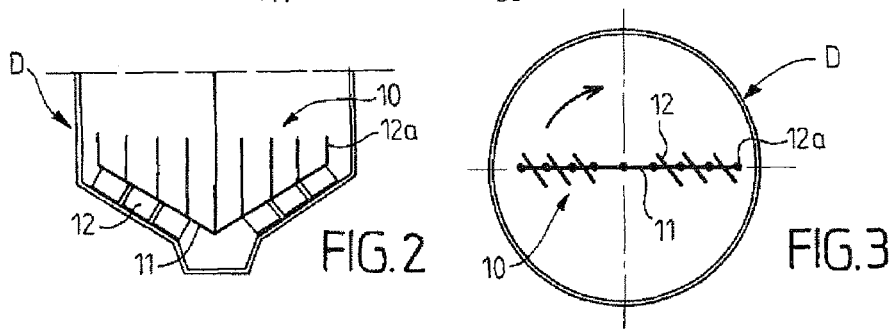
FIG.2
FIG.3
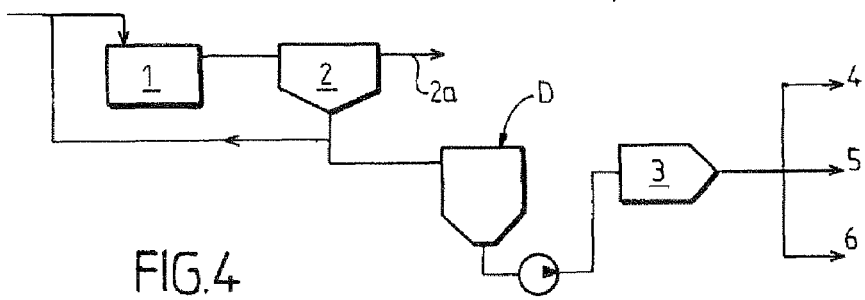
FIG.4

QUICK STATIC DECANTER FOR PRETHICKENING WATER TREATMENT SLUDGE, AND PLANT INCLUDING SUCH A DECANTER

CROSS REFERENCE TO RELATED APPLICATIONS

This application is a National Phase filing under 35 U.S.C. §371 of PCT/IB2009/055928 filed on Dec. 23, 2009; and this application claims priority to Application No. 0807445 filed in France on Dec. 24, 2008 under 35 U.S.C. §119; the entire contents of all are hereby incorporated by reference.

The invention relates to a static settler for prethickening the liquid sludge in a water treatment plant, in particular a wastewater plant, comprising an inclined bottom and equipped with a liquid sludge feed pump, a device for injecting polymer into the liquid sludge, an overflow discharge and a pump for extracting the prethickened sludge from the settler.

Settlers of this type are known, in particular from Memento Technique de l'Eau, 10$^{th}$ Edition DEGREMONT, volume 2, pages 833 et seq.

In a wastewater treatment plant, the settler is generally located downstream of a clarifier, which is located downstream of an aeration tank. The effluent from the clarifier and constituting the liquid sludge entering the settler has a variable suspended solids concentration, ranging from 1 to 8 g/L. The prethickened sludge extracted from the settler may have a suspended solids concentration of 15 to 20 g/L.

Said sludge is then subjected to thickening or dehydration treatment to reduce its volume.

The properties of the extracted prethickened sludge displays variations which need to be reduced to optimize the operation of the thickeners installed downstream of the settler, and to decrease the overall power consumption.

It is also desirable to improve the degree of sludge prethickening in order to alleviate the thickening and dehydration treatment, and thereby help to reduce the power consumption.

It is therefore the primary object of the invention to provide a static settler which is suitable for obtaining, at the outlet, a prethickened sludge favorable to optimal operation of a thickener, in particular a centrifuge, without causing any deterioration in the quality of the water treated.

It is a further object of the invention to provide a settler equipped so as to optimize the polymer consumption.

According to the invention, a static settler for prethickening liquid sludge in a water treatment plant, in particular a wastewater plant, for optimizing the operation of the thickeners installed downstream of the settler, comprises an inclined bottom, and is equipped with a liquid sludge feed pump, a device for injecting polymer into the liquid sludge, an overflow discharge and a pump for extracting the prethickened sludge from the settler, and is characterized in that it comprises:
means for accelerating the settling of the sludge,
means for controlling the suspended solids concentration of the prethickened sludge at the outlet, capable of maintaining the concentration of the prethickened sludge extracted from the settler substantially constant, despite concentration variations at the inlet,
and means for controlling the level of the sludge blanket capable of maintaining said level as low as possible.

The static settler is thus a rapid settler which serves to obtain prethickened sludge in a sufficiently short time to avoid deterioration of the water treated, in particular in a time shorter than that which would cause salting out of the phosphorus by the bacteria. The salted out phosphorus would lower the quality of the treated water. The rapid settler further ensures a constant and high degree of prethickening for the downstream treatment.

The means for accelerating the settling of the sludge may comprise an angle of inclination of the bottom of the settler to the horizontal of between 20° and 45°, and a rotating bottom scraper. Said scraper preferably comprises an arm equipped with scraper blades disposed in a slatted arrangement so as to convey the settled sludge effectively and rapidly toward a central pit. Said central pit is also scraped. The arm is advantageously equipped with a harrow promoting the prethickening of the sludge. The scraper arm may have a V shape to match the bottom of the settler.

Preferably, the means for controlling the concentration of prethickened sludge comprise means for controlling the mass flow rate of suspended solids entering the settler, and means for controlling the concentration of the prethickened sludge from the inlet mass flow rate.

Advantageously, the means for controlling the mass flow rate of suspended solids entering the settler comprise:
a variable speed liquid sludge feed pump,
a liquid sludge flowmeter,
a probe for measuring the suspended solids concentration of the liquid sludge, and
a controller which receives the data from the flowmeter and from the probe, and controls the speed of the feed pump to maintain the feed mass flow rate substantially constant.

Preferably, the means for controlling the concentration of the extracted sludge from the inlet mass flow rate comprise:
a variable speed prethickened sludge extraction pump,
a prethickened sludge flowmeter,
a probe for measuring the suspended solids concentration of the prethickened sludge, and
a controller which receives the data from the flowmeter and from the probe, and controls the speed of the extraction pump to maintain the concentration of prethickened sludge substantially constant, the initial extraction rate being calculated from the inlet mass flow rate and an extracted sludge concentration setpoint.

Advantageously, the settler comprises means for controlling the level of the sludge blanket and capable of maintaining said level as low as possible, with optimization of the polymer consumption.

The means for controlling the level of the sludge blanket may comprise a probe for measuring the height of the sludge blanket, a variable speed polymer feed pump, a flowmeter on the polymer injection line, and a controller or speed variator receiving the data from the probe measuring the height of the sludge blanket and from the flowmeter, and capable of controlling the speed of the pump to optimize the polymer consumption.

The settler is provided so that the residence time of the sludge in the settler does not exceed two hours. Preferably, the settler comprises a frustoconical bottom having and downwardly decreasing cross section, the angle of inclination ($\alpha$) of the bottom generatrices to the horizontal being between 20° and 45°. The level of the sludge blanket is advantageously maintained substantially at the level of the large base of the frustoconical bottom. The peripheral speed of the scraper may be between 10 and 20 cm/s. Advantageously, the scraper comprises at least one scraper blade and one harrow.

The invention further relates to a wastewater treatment plant, characterized in that it comprises a settler as defined above, and in that the settler extraction outlet is connected directly to a sludge thickener, in particular a centrifuge or a belt filter, without a thickened sludge buffer tank between the settler and the sludge thickener.

Besides the arrangements described above, the invention comprises a number of other arrangements which are more clearly elucidated below, with regard to an exemplary embodiment described with reference to the appended drawings, but which is nonlimiting. In these drawings:

FIG. 1 is a schematic vertical cross section of a settler of the invention, with its attachments.

FIG. 2 is a diametral vertical cross section, at a larger scale, showing details of the rotating scraper with its scraper blades and its harrow.

FIG. 3 is a schematic horizontal cross section of the scraper in FIG. 2.

FIG. 4 is a rough schematic of a wastewater treatment plant with a settler of the invention.

Figure 5:
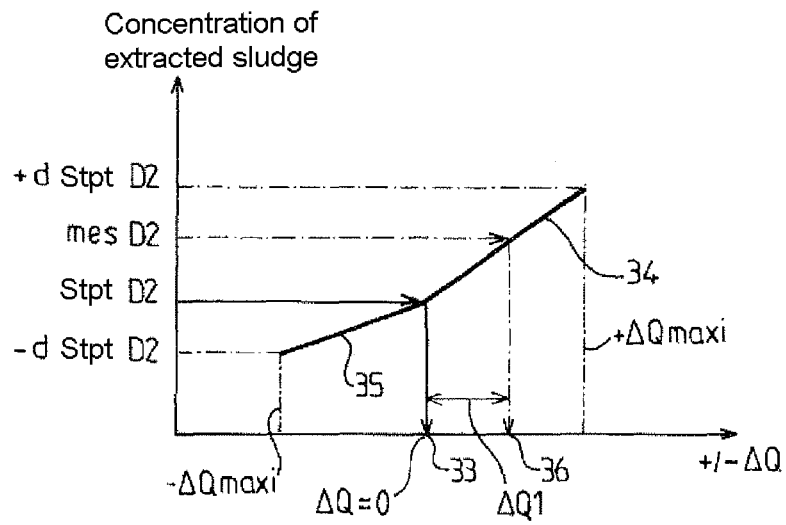
FIG. 5 is a diagram showing the adjustment of the extraction flow rate.

FIGS. 1 and 4 show a rapid static settler D for a wastewater treatment plant schematically shown in FIG. 4. The plant comprises an aeration tank 1 for activated sludge treatment, followed by a clarifier 2 from which the clarified water is extracted at the top 2a, while the liquid sludge is partly sent to the settler D, and the remainder is recycled to the top of the tank 1.

The suspended solids concentration of the liquid sludge reaching the settler D may be above 1 to 8 g/L. The suspended solids concentration of the prethickened sludge leaving the settler D is generally between 15 and 20 g/L. The effluent leaving the settler D is sent to a thickener, in particular a centrifuge 3. The suspended solids concentration at the outlet of the centrifuge 3 may be between 50 and 60 g/L (or even between 200 and 300 g/L). The effluent leaving the centrifuge is sent either to a sludge digester 4, or to a dehydrator 5 or to a dryer 6.

In order to operate the thickener at optimal performance, in particular the centrifuge 3, the rapid settler D of the invention provided serves to obtain a prethickened sludge at the outlet having a substantially constant suspended solids concentration, despite the concentration variations at the inlet.

As shown in FIG. 1, the rapid settler D consists of a reactor 7 having a vertical axis, with a bottom 8 inclined to the horizontal at an angle α which may be between 20 and 45°.

In general, the reactor 7 is cylindrical and the bottom 8 is frustoconical, with a downwardly decreasing cross section, converging toward a central recovery pit 9. The settler D is equipped with a rotating bottom scraper 10 with an arm 11 having a V shape matching, according to the diameter, the bottom 8 of the settler. The arm 11 is equipped with scraper blades 12 disposed in a slatted arrangement (FIGS. 2 and 3), in order to convey the settled sludge effectively and rapidly toward the central recovery pit 9, which is also scraped, and with a harrow 12a promoting the prethickening of the sludge. The harrow 12a has vertical blades distributed in a radial direction. The central pit 9 is specially designed to avoid short-circuits in sludge extraction. The settler D is provided so as to limit the residence time of the sludge to less than two hours.

The settler D is equipped with a variable speed pump 13 for liquid sludge feed, which discharges to a discharge line 14 equipped with a probe 15 for measuring the suspended solids concentration D1. The probe 15 is generally optical. A flowmeter 16, in particular an electromagnetic flowmeter, is installed on the line 14. Downstream of the flowmeter a mixture 17 is placed on the line for injecting polymer into the sludge to promote the settling of the sludge. The polymer solution injected is prepared in a tank B with addition of drinking water 18. A variable speed pump 19 is provided for feeding polymer to the mixer 17. A flowmeter 20 is installed on the discharge line of the pump 19 to provide the flow of polymer solution sent to the mixer 17. The liquid sludge, mixed with polymer, is introduced at the top 21 of the settler D which is equipped, in its internal upper portion, with a chute 22 for recovering the overflow removed via an external discharge 23.

The settler D is further equipped, at the top, with a probe 24 for measuring the height of the sludge blanket V in the settler. The probe 24 is generally an ultrasonic probe. Valves 25 are provided at various levels on the outer wall of the settler for taking samples.

From the recovery pit 9, the prethickened sludge is extracted using a variable speed pump 26 which discharges into a line 27 on which a probe 28 for measuring the suspended solids concentration D2 and a flowmeter 29 are installed.

To provide numerical and nonlimiting examples, the feed pump 13 may have a delivery between 9 and 53 m$^3$/h while the extraction pump 26 may have a delivery between 3 and 16 m$^3$/h. The settler D may have a diameter of about 3 meters and a height of about 4 meters.

The data from the probe 15 and the flowmeter 16 are sent to a PID controller 30 of which the output controls the speed of rotation of the pump 13.

The data from the probe 28 and the flowmeter 29 are sent to a PID controller 31 of which the output controls the speed of rotation of the extraction pump 26.

The data from the probe 24 and the flowmeter 20 are sent to a PID controller, or a speed variator, 32, of which the output controls the speed of rotation of the polymer feed pump 19.

The controllers 30, 31, with the measurement probes 15, 28, the flowmeters 16, 29 and the variable speed pumps 13, 26, constitute means M for controlling the suspended solids concentration of the sludge extracted from the settler D.

The controller 30, the measurement probe 15, the flowmeter 16 and the variable speed pump 13 constitute means M1 for controlling the mass flow rate FM1 of suspended solids entering the settler D.

The controller 31, the measurement probe 28, the flowmeter 29 and the variable speed pump 26 constitute means M2 for controlling the concentration of the extracted sludge, from the inlet mass flow rate FM1.

The controller or variator 32, the probe 24 for measuring the height of the blanket, the flowmeter 20 and the variable speed pump 19 constitute means M3 for controlling the flow rate of polymer injected into the settler D.

The automation for controlling the flow rates treated on the settler D is based on these various controls:
  control of the constant flow rate FM1 of the liquid sludge feed from the reactor,
  control of the maintenance of the concentration D2 of the extracted prethickened sludge,
  maintenance of the level of the sludge blanket V as low as possible in the reactor D with optimization of the polymer consumption.
These three controls serve to ensure:
  the optimization of the injected polymer consumption when the need arises to add polymer;
  monitoring of the clarified water quality in the overflow;
  maintenance of the sludge blanket at the lowest possible level to avoid long residence times, aging and deterioration of the prethickened sludge (sludge denitrification, phosphorous salting out);

maintenance of a constant concentration of the outgoing sludge, which serves to reduce, or even to eliminate, a buffer tank for recovering the prethickened sludge, which is normally placed upstream of the centrifuge 3 and downstream of the settler D.

The settler D and the control means operate as follows.

Control of the Sludge Inlet Mass Flow Rate

The mass flow rate FM1 of suspended solids in the water to be treated entering the settler D is set by an operator. The suspended solids concentration D1 in the water to be treated is delivered by the probe, or sensor, 15. If F1 is the flow rate of water to be treated, the mass flow rate is F1×D1 which must be equal to the set value FM1. The flow rate setpoint F1 is determined from:

$$F1=FM1/D1$$

The PID controller 30 positions the speed of the feed pump 13 to maintain the flow rate setpoint F1 by using the measurement from the flowmeter 16.

Control of the Concentration of Extracted Sludge From the Inlet Mass Flow Rate FM1.

The extracted sludge concentration setpoint (Stpt D2) is set by the operator. A first extraction flow rate F2 is calculated by assuming, as a first approximation, that the actual concentration of extracted sludge is equal to the selected setpoint value. In this case, by writing that the extracted mass flow rate is equal to the inlet mass flow rate: F2×Stpt D2=FM1, we obtain:

$$F2=FM1/\text{Stpt } D2$$

The PID controller 31 positions the speed of the extraction pump 26 to maintain the flow rate setpoint Q=F2, using the measurement from the flowmeter 29.

However, the extracted sludge concentration D2, measured by the probe 27, will not be equal to Stpt $D_2$, but will be close to it. A periodic flow rate correction (every 30 seconds to 300 seconds) is made to adjust the flow rate in order to obtain an outlet concentration equal to the setpoint.

This flow rate correction is explained with reference to the diagram in FIG. 5. The flow rate correction $\Delta Q$ is plotted on the x-axis and the deviations±d StptD2 between the measured value D2 and the setpoint value Stpt D2 are plotted on the y-axis. The origin of the flow rate corrections, corresponding to $\Delta Q=0$, is located at point 33, which corresponds to the flow rate serving to effectively obtain the value Stpt D2. The corrections $\Delta Q$ are positive or negative according to whether the flow rate must be increased or decreased with regard to the flow rate corresponding to point 33. The origin of the deviations±d StptD2 is located at the value StptD2, and the deviations are positive when the measurement D2 is higher than Stpt D2, and negative in the opposite case. The flow rate correction curves 34, 35 are determined experimentally. The curve 34, having a steeper slope, corresponds to the concentration of an effluent excessively laden with solid matter extracted from the settler D, while the curve 35, having a lower slope, corresponds to a thickening of an effluent that is not sufficiently laden with solid matter, extracted from the settler D. The reactions of the system are different in deconcentration and in thickening, giving rise to different slopes.

In the example shown in FIG. 5, a first calculated extraction flow rate F2 gives a concentration value measured by the probe 28 equal to: ss D2 which is higher than D2. The curve 34 makes this measurement correspond to point 36 on the x-axis. The calculated initial flow rate F2 in increased by $\Delta Q1$. The control provided by the controller 30 serves to make the measured concentration approach the setpoint Stpt D2.

In practice, the maximum flow rate correction values±$\Delta Q$ max are about ±0.5 m³/h. The measurement signal corresponds to a mean over 10 minutes, recalculated every minute.

Control of Polymer Injection

The polymer pump 19 is controlled by the controller 32 or speed variator, and the speed setpoint is calculated from the feed mass flow rate FM1=F1×D1 and the position of the level of the sludge blanket V.

Calculation of the Polymer Flow Rate

The polymer setpoint is calculated with the following details:

$T_{Polym}$=rate of polymer treatment (optimal dose of polymer to be injected into the water to be treated)

$C_{Polym}$=polymer concentration (polymer concentration in the injected solution)

$FMA_{calculated}$=Calculation of the flow rate (F1$_{real}$×D1$_{real}$)

Stpt $Q_{polym}$=Polymer flow rate setpoint (setpoint of flow rate of injected polymer solution)

$$\text{Stpt } Q_{polym} \times C_{Polym} = T_{Polym} \times FMA_{calculated}$$

hence the polymer flow rate setpoint:

$$\text{Stpt } Q_{polym} = T_{Polym} \times FMA_{calculated} \times 1/C_{Polym}$$

Figure 6:
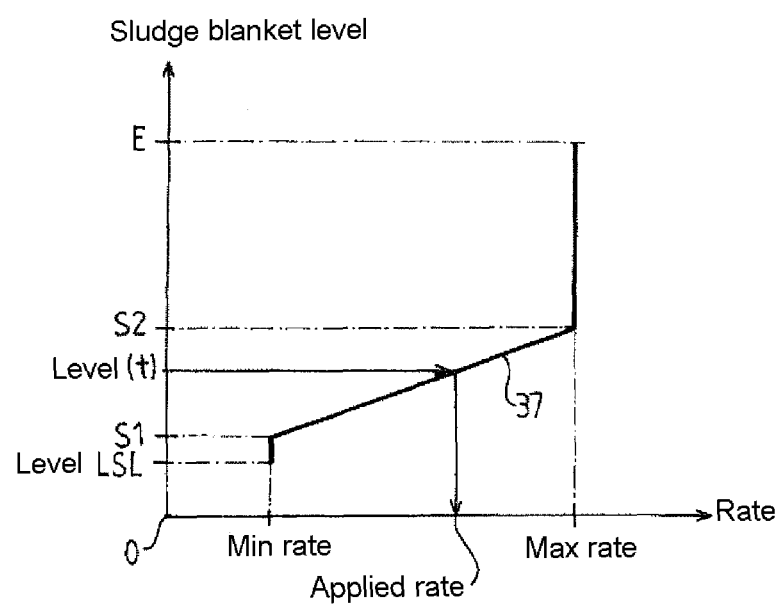
FIG. 6 is a diagram illustrating the principle for calculating the rate of polymer applied.

Calculation of Polymer Flow Rate Adjusted According to the Level of the Sludge Blanket The following explanations are provided with reference to FIG. 6, which shows a polymer rate adjustment curve. The level of the sludge blanket is plotted on the y-axis, and the polymer rate on the x-axis.

The origin O of the y-axis corresponds to the lowest possible level of the sludge blanket, that is to say, at the bottom of the settler D. S1 or "threshold 1" corresponds to the level of the sludge blanket obtained with the polymer rate considered as a minimum. This minimum polymer rate may be about 0.5 mg/L. S2 or "threshold 2" corresponds to the level of the sludge blanket obtained with the polymer rate considered as a maximum. This maximum rate may be about 2 mg/L. The curve 37 shows the variation in the level of the sludge blanket as a function of the polymer rate to be applied.

On the y-axis, point E corresponds to the highest possible theoretical level of the blanket, that is to say, at the top of the level of the probe 24; the point Level LSL, located below "threshold 1" corresponds to the interruption of polymer injection.

The signal indicating the level of the sludge blanket V is supplied by the ultrasonic probe 24. A mean over 10 min is calculated and recalculated every minute.

The delivery of the polymer pump 19 remains calculated from the calculated feed mass flow rate $FMA_{calculated}$. This flow rate is periodically corrected if necessary to maintain the level of the sludge blanket V within a given range between S1 and S2, and as low as possible. This correction is made under the following conditions.

Periodically, every T3 seconds, with 1 s<T3<1800 s, the position of the blanket at the level of the sludge blanket V is monitored. At "Level (t)", the "applied rate" corresponds to time t.

The applied treatment rate $T_{Polym}$ for calculating the polymer flow rate is corrected according to the measurement of the level of the sludge blanket taken at the end of the time lag T3 elapsed.

As long as "Level(t)" remains within the range between S1 and S2, the applied polymer rate is adjusted according to the portion of line 37.

As soon as the level of the sludge blanket falls below threshold S1, the injected polymer rate is maintained at the minimum rate. If the blanket level falls below Level LSL, injection is stopped.

When the level of the sludge blanket rises above threshold S2, the injected polymer rate is maintained at the maximum, to lower the sludge blanket.

The limits of $T_{Polym}$ applied are, for example (0.5 mg/L min and 2.0 g/L max). At the start, the first calculation is made with a parameterizable initial rate (T $init_{Polym}$). Thresholds S1 and S2 are parameterizable.

The invention serves to maintain the extracted sludge concentration substantially constant and thereby to optimize the operation of the machines, in particular centrifuges, downstream of the settler. This provides a higher yield of the plant and lowers the power consumption.

The invention also serves to reduce the polymer consumption, which is practically halved, while preserving, and even improving, the quality of the extracted sludge.

The scraper blades 12 of the scraper 10 serve to convey the sludge rapidly toward zone 9 to decrease its residence time in the settler D. The sludge residence time in the settler is preferably shorter than 2 hours.

The harrow 12a serves to set the flocs in motion, promoting a degassing and concentration of the sludge.

The invention claimed is:

1. A static settler for prethickening liquid sludge in a water treatment plant for optimizing operation of one or more thickeners installed downstream of the settler, the settler comprising:
    a reactor having a sloped bottom converging toward a central recovery pit for extracting prethickened sludge from the reactor, a liquid sludge inlet, a device for injecting polymer into the liquid sludge, and an overflow discharge, wherein:
    means for accelerating settling of the sludge in the reactor,
    means (M) for controlling the suspended solids concentration of the prethickened sludge at an outlet of the reactor, the means for controlling the suspended solids concentration being configured to maintain the concentration of the prethickened sludge extracted from the settler substantially constant independent of concentration variations from the liquid sludge inlet, and
    means (M3) for controlling a level of the sludge blanket (V) in the reactor, the means for controlling the level of the sludge blanket being configured to maintain the level of the sludge blanket at or below a first predetermined level selected to minimize residence times of the prethickened sludge in the settler, wherein the means for controlling the level of the sludge blanket comprise a first probe for measuring the height of the sludge blanket, a variable speed polymer feed pump, a polymer flowmeter on the polymer injection line, and a first controller receiving data from the first probe measuring the height of the sludge blanket in the reactor and from the polymer flowmeter, the first controller configured to control the speed of the polymer feed pump in response to the received data, to control a flow rate of the polymer into the reactor, to adjust the flow rate of the polymer into the reactor to lower the level of the sludge blanket to be at or below the first predetermined level, to maintain the flow rate of the polymer at a predetermined rate when the level of the sludge blanket is at or below the first predetermined level and above a second predetermined level, and to cut off the flow rate of the polymer when the level of the sludge blanket falls below the second predetermined level.

2. The settler as claimed in claim 1, wherein the means for accelerating the settling of the sludge comprise an angle of inclination of the sloped bottom to the horizontal of between 20° and 45°, and a rotating, bottom scraper.

3. The settler as claimed in claim 2, wherein the scraper comprises an arm equipped with scraper blades disposed in a slatted arrangement so as to convey the settled sludge effectively and rapidly toward a central pit which is also scraped.

4. The settler as claimed in claim 3, wherein the arm is equipped with a harrow promoting the prethickening of the sludge.

5. A water treatment plant, comprising the settler of claim 1 having a settler extraction outlet connected directly to a sludge thickener without a thickened sludge buffer tank between the settler and the sludge thickener.

6. The settler as claimed in claim 1, wherein the means for controlling the concentration of prethickened sludge comprise means for controlling the mass flow rate of suspended solids entering the settler, and means for controlling the concentration of the prethickened sludge from the inlet mass flow rate.

7. The settler as claimed in claim 6, wherein the means for controlling the mass flow rate of suspended solids entering the settler comprise:
    a variable speed liquid sludge feed pump,
    a liquid sludge flowmeter,
    a second probe for measuring the suspended solids concentration of the liquid sludge, and
    a second controller which receives the data from the liquid sludge flowmeter and from the second probe, and controls the speed of the feed pump to maintain the feed mass flow rate substantially constant.

8. The settler as claimed in claim 6, wherein the means for controlling the concentration of the extracted sludge from the inlet mass flow rate comprise:
    a variable speed prethickened sludge extraction pump,
    a prethickened sludge flowmeter,
    a second probe for measuring the suspended solids concentration of the prethickened sludge, and
    a second controller which receives the data from the prethickened sludge flowmeter and from the second probe, and controls the speed of the extraction pump to maintain the concentration of prethickened sludge substantially constant, the initial extraction rate being calculated from the inlet mass flow rate (FM1) and an extracted sludge concentration setpoint (Stpt D2).

9. The settler as claimed in claim 1, wherein the first controller is configured to control the speed of the polymer feed pump to optimize the polymer consumption within the reactor.

10. The settler as claimed in claim 1, wherein the means for accelerating the settling of the sludge, the means for controlling the suspended solids concentration and the means for controlling the level of the sludge blanket are configured in combination to function so that a residence time of the sludge in the settler does not exceed two hours.

11. The settler as claimed, in claim 1, wherein the sloped bottom has a frustoconical shape, and the means (M3) for controlling the level of the sludge blanket is configured to maintain the level of the sludge blanket substantially at a level of a large base of the frustoconical shaped sloped bottom.

12. The settler as claimed in claim 2, wherein the peripheral speed of the scraper is between 10 cm/s and 20 cm/s.

* * * * *